United States Patent [19]
Dinkins

[11] Patent Number: 5,633,876
[45] Date of Patent: May 27, 1997

[54] STORE AND FORWARD REPEATER

[75] Inventor: Gilbert M. Dinkins, Herndon, Va.

[73] Assignee: Eon Corporation, Reston, Va.

[21] Appl. No.: 383,806

[22] Filed: Feb. 3, 1995

Related U.S. Application Data

[63] Continuation-in-part of Ser. No. 966,414, Oct. 26, 1992, Pat. No. 5,388,101.

[51] Int. Cl.[6] ........................................ H04B 3/36
[52] U.S. Cl. ........................ 370/315; 370/349; 370/350
[58] Field of Search ................................. 370/95.1, 953, 370/69.1, 71, 73, 75, 76, 124, 85, 1, 97, 104.1, 61; 348/6, 7, 12, 13; 455/3.1, 3.2, 4.1, 5.1, 6.1

[56] References Cited

U.S. PATENT DOCUMENTS

| | | | |
|---|---|---|---|
| 4,509,199 | 4/1985 | Ichihara | 370/97 |
| 4,930,118 | 5/1990 | Sugihara | 370/97 |
| 5,200,955 | 4/1993 | McFarlane et al. | 370/97 |

*Primary Examiner*—Wellington Chin
*Assistant Examiner*—Melissa Kay Carman
*Attorney, Agent, or Firm*—Cushman Darby & Cushman, IP Group of Pillsbury Madison & Sutro LLP

[57] ABSTRACT

A system and method for communicating between local subscriber units and a local base station repeater cell in a two-way communication interactive data broadcast network. In one embodiment, a store and forward repeater receives data signals transmitted by a local base station repeater cell and forwards the signals to local subscriber units. Responses from the local subscriber units are then transmitted from the local subscriber units back to the local base station repeater cell means via a local remote receiver. In so doing, two-way communication is achieved between a local base station repeater cell and local subscriber units.

31 Claims, 3 Drawing Sheets

STORE AND FORWARD REPEATER

This is a Continuation-In-Part of application Ser. No. 07/966,414, filed Oct. 26, 1992, by G. Dinkins, now U.S. Pat. No. 5,388,101, entitled "Interactive Nationwide Data Service Communication System For Stationary And Mobile Battery Operated Subscriber Units".

TECHNICAL FIELD

This invention relates to an interactive two-way data service network, and more particularly, to communication within an interactive two-way broadcast data service network.

BACKGROUND ART

Communication within an interactive two-way broadcast data service network is described in detail in U.S. Pat. No. 5,388,101, by G. Dinkins, entitled "Interactive Nationwide Data Service Communication System For Stationary And Mobile Battery Operated Subscriber Units." In such a system, a local base station repeater cell transmits digital data to individual low-cost, portable, battery-operated, milliwatt transmitter, subscriber units within a local base station designated area. A plurality of receive only stations, remote receivers, are distributed throughout the local base station designated area and are connected by wire, cable, microwave link, or radio to the local base station repeater cell. The remote receivers are referred to as receive only stations because they receive signals from the subscriber units but do not transmit signals to the subscriber units. The remote receivers process and relay transmitted digital data received from the individual subscriber units. Thus, the local base station repeater cell transmits data directly to the individual subscriber units. The milliwatt transmitter individual subscriber units, however, do not transmit data directly back to the local base station repeater cell. Instead, the individual subscriber units transmit to a remote receiver which then relays the data to the local base station repeator cell. The use of remote receivers allows the individual subscriber units to transmit data signals using power in the milliwatt range.

Unfortunately, under certain conditions, individual subscriber units are unable to receive transmissions from the local base station repeater cell. For example, a user may purchase a subscriber unit and place the subscriber unit in, for example, a basement or other physical location which prevents the subscriber unit from receiving transmissions from the local base station repeater cell. Likewise, the subscriber unit might be placed in a location such as, for example, a building with concrete walls which substantially weaken the intensity of the rf signals received by the subscriber unit.

In an attempt to alleviate reception problems, local base station repeater cells have been situated with overlapping coverage to produce strong signals throughout a given area. However, such placement of local base station repeater cells is extremely costly due to the number of local base station repeater cells required, and such "crowded" placement of the local base station repeater cells is not always practical. In a further attempt to deal with ineffective communication between the local base station repeater cell and the subscriber unit, the location of the user is determined at the time of sale of the subscriber unit to the user. However, even if the user's location is within an area with strong local base station repeater cell coverage, the subscriber unit might still be placed in a physical location which weakens rf signals or completely prevents the subscriber unit from receiving rf signals from the local base station repeater cell.

Thus, the need has arisen for a system to provide for effective transmission of data signals from a local base station repeater cell to subscriber units in areas where such communication has previously been impaired, which provides for the reception of strong rf signals at the subscriber units, which does not require the addition of numerous costly local station repeater cells, which is not dependent on the physical location of the subscriber unit, and which does not significantly increase the cost of communication within the interactive two-way broadcast data service network.

DISCLOSURE OF THE INVENTION

It is therefore an object of the present invention to provide for effective transmission of data signals from a local base station repeater cell to subscriber units in areas where such communication has previously been impaired, which provides for the reception of strong rf signals at the subscriber units, which does not require the addition of numerous costly local station repeater cells, which is not dependent on the physical location of the subscriber unit, and which does not significantly increase the cost of communication within the interactive two-way broadcast data service network. The above object has been achieved using a store and forward repeater which is used to relay data signals from a local base station repeater cell to local subscriber units. In one embodiment, the store and forward repeater receives rf transmissions of data signals from the local base station repeater cell on a first carrier frequency, and places the data signals in memory. The store and forward repeater then retransmits the data signals over a second carrier frequency to the subscriber units. In the present embodiment, the intensity of the data signals retransmitted by the store and forward repeater is greater than the intensity of the data signals received by the store and forward repeater. In so doing, the store and forward repeater boosts the strength of the data signals received by the subscriber units. Responses from the subscriber unit are then transmitted over an rf link from the subscriber unit to a local remote receiver. The local remote receiver then transmits the responses over, for example, a hard wire link to the local base station repeater cell. In so doing, two-way communication in an interactive data broadcast network are achieved even in conditions which have previously prevented such communication.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
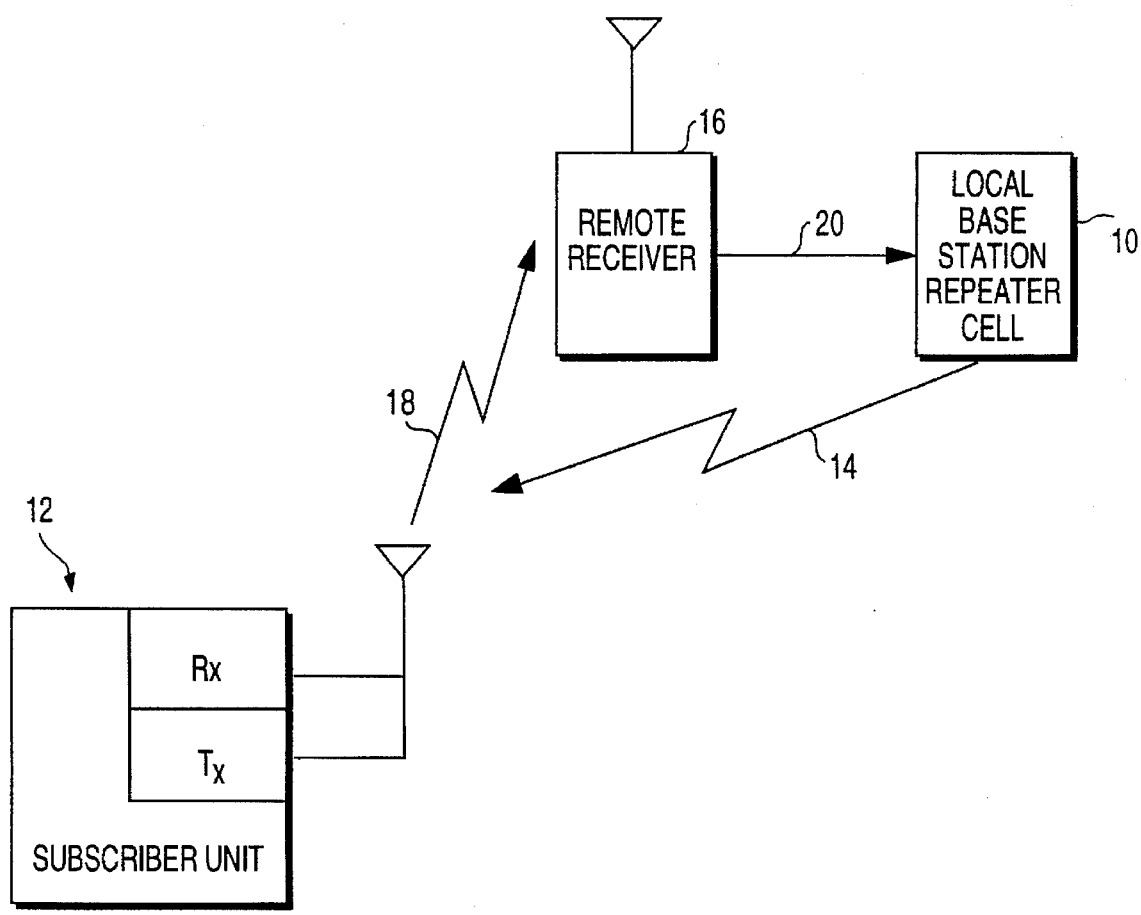
FIG. 1 shows a Prior Art interactive broadcast system wherein a local base station repeater cell transmits data directly to a subscriber unit.

With reference now to Prior Art FIG. 1, an interactive broadcast network as set forth in U.S. Pat. No. 5,388,101, by G. Dinkins, entitled "Interactive Nationwide Data Service Communication System For Stationary And Mobile Battery Operated Subscriber Units" is schematically shown. As shown in Prior Art FIG. 1, a local base station repeater cell 10 communicates with a subscriber unit 12 over an rf link 14 of, for example 218–219 MHz. Subscriber unit 12 transmits data back to local base station repeator cell 10 via a remote receiver 16. That is, subscriber unit 12 transmits messages directly to remote receiver 16 over an rf link 18. Remote receiver 16 then transfers the messages received from subscriber unit 12 to local base station repeater cell 10 over, for example, hard wire link 20. In the present embodiment, link 18 is an rf link having a frequency in the range of approximately 218–219 MHz. Although rf link 18 has a frequency of approximately 218–219 MHz in the present embodiment, the present invention is also well suited to having an rf link 18 of other frequencies.

With reference still to Prior Art FIG. 1, under certain conditions, subscriber unit 12 is unable to receive transmissions via rf link 14 from local base station repeater cell 10. For example, subscriber unit 10 may be positioned, for example, in a basement or other physical location which weakens rf signals or completely prevents subscriber unit 12 from receiving transmissions from local base station repeater cell 10 over rf link 14.

Figure 2:
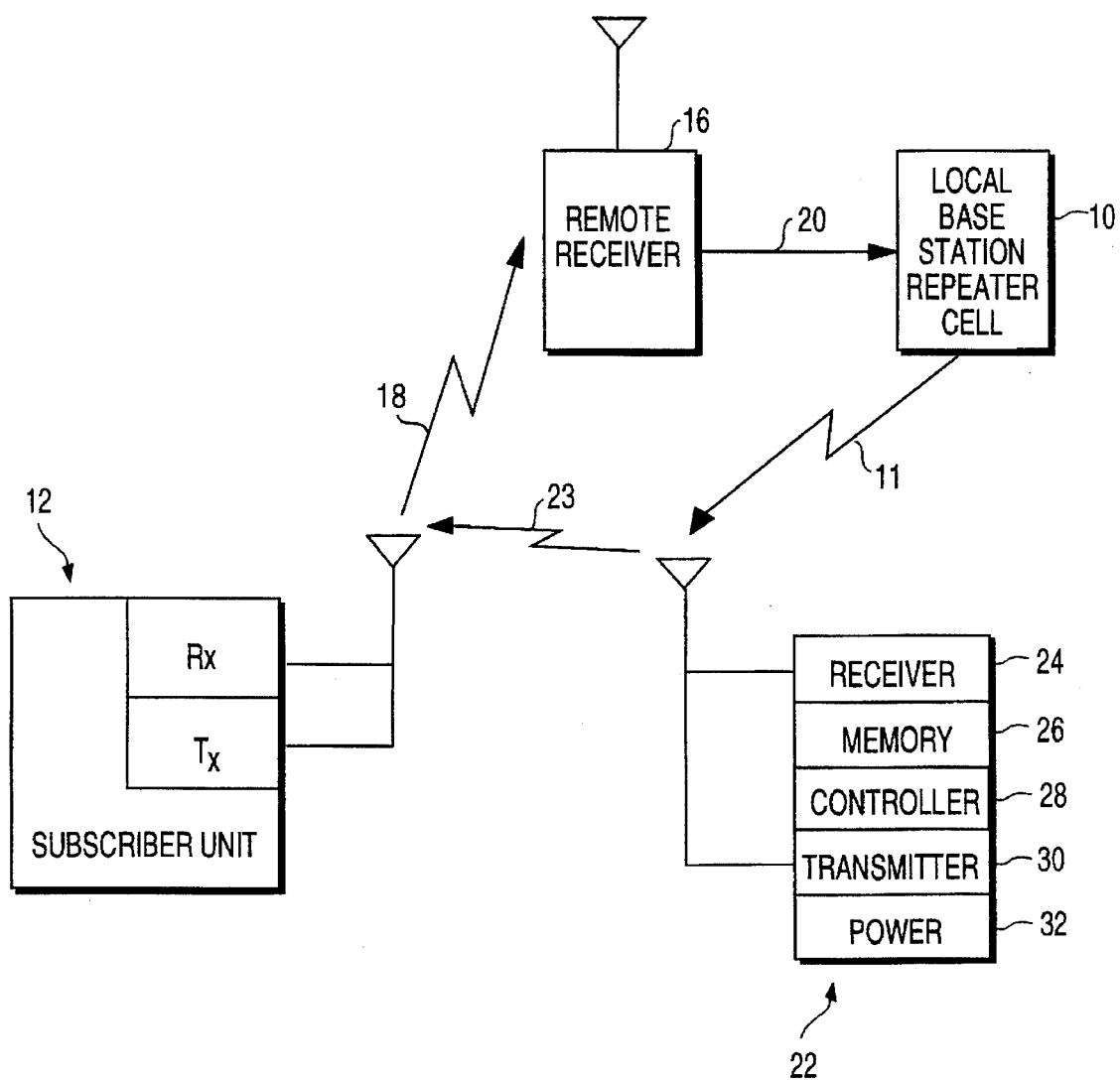
FIG. 2 shows an interactive broadcast system configuration wherein a store and forward repeater relays data signals from a local base station repeater cell to a subscriber unit in accordance with the present invention.

With reference next to FIG. 2, a communication system including a store and forward repeater 22 for relaying data signals between a local base station repeater cell 10 and a subscriber unit 12 is shown. As shown in FIG. 2, store and forward repeater 22 includes a receiver 24, memory 26, controller 28, transmitter 30, and power supply 32. In the present embodiment, local base station repeater cell 10 broadcasts data signals on an rf carrier frequency. The rf link between local base station repeater cell 10 and store and forward repeater 22 is shown as link 11. The data signals are received by receiver 24 of store and forward repeater 22. Receiver 24 is tuned to the rf carrier frequency of local base station repeater cell 10. In the present embodiment, receiver 24 is tuned to receive rf transmissions in the range of approximately 218–219 MHz. Although receiver 24 is tuned to approximately 218–219 MHz in the present embodiment, the present invention is also well suited to having receiver 24 tuned to other frequencies matching the transmission frequency of local base station repeater cell 10.

Store and forward repeater 22 stores the data signals in memory 26. In the present embodiment, memory 26 is a shift register. Although a shift register is used in the present embodiment, the present invention is also well suited to the use of numerous other types of memory well known in the art. The data signals are then transferred from memory 26 to transmitter 30. Controller 28 controls the transfer of the data signals from memory 26 to transmitter 30. Transmitter 30 then transmits the data signals to subscriber unit 12 using an rf carrier frequency. The rf link between store and forward repeater 22 and subscriber unit 12 is shown as link 23. Power is supplied to store and forward repeater 22 by power supply 32. Subscriber unit 12 sends response data signals over rf link 18 to local remote receiver 16. Local remote receiver 16 sends the response data signals over, for example, hard wire link 20 back to local base station repeater cell 10. Thus, the present invention provides for two-way communication between a local base station repeater cell and a subscriber unit.

In the present embodiment, transmitter 30 of store and forward repeater 22 transmits the data signals to subscriber unit 12 on an rf carrier frequency which is the same as the carrier frequency at which local base station repeater cell 10 transmits. However, transmitter 30 transmits the data signals therefrom at an intensity which is much greater than the intensity of the data signals when they are received at receiver 24. In so doing, store and forward repeater 22 boosts the intensity of the data signals at or near subscriber unit 12 to a usable level. Therefore, the present invention enables rf communication between a local base station repeater cell 10 and a subscriber unit 12 even in locations and conditions where such communication has not previously been possible. As an example, in the present embodiment, store and forward repeater 22 is placed, for example, on the roof of a building or apartment containing subscriber units therein and where the building or apartment is formed of reinforced concrete or cement. Although a building or apartment formed of such material would normally weaken or completely prevent reception by the subscriber unit of rf signals transmitted from a local base station repeater cell, the store and forward repeater of the present invention sufficiently boosts the intensity of the data signals to a level which allows subscriber unit 12 to receive rf transmissions of the data signals. Although store and forward repeater 22 is placed on the roof of a building or apartment in the present embodiment, the present invention is also well suited to having store and forward repeaters 22 placed in other locations such as, for example, in a basement of a building, on each floor of a high-rise complex, in sports arenas, in terrain depressions, or in various locations throughout a residential subdivision etc.

In the present embodiment, the receiver of subscriber unit 12 is tuned to receive data signals broadcast from store and forward repeater 22 on an rf carrier in the range of approximately 218–219 MHz. Thus, in the present embodiment, the frequency of the rf carrier used to transmit data signals from local base station repeater cell 10 to store and forward repeater 22 is the same as the frequency of the rf carrier used to transmit data signals from store and forward repeater 22 to subscriber unit 12. However, in order for the same carrier frequency to be used in link 11 and link 23, any data signals broadcast from local base station repeater cell 10 must be extremely weak, for example less than 95 dBm, at subscriber unit 12. If data signals broadcast from local base station repeater cell 10 are not extremely weak, subscriber unit 12 can receive data signals from both local base station repeater cell 10 and store and forward repeater 22. Overlapping data signals can result in cancellation problems and prevent accurate communication.

In another embodiment of the present invention, in instances where data signals broadcast from local base station repeater cell 10 are not extremely weak at each of the respective receiving subscriber units, the frequency of the rf carrier used to transmit data signals from local base station repeater cell 10 to store and forward repeater 22 is different than the frequency of the rf carrier used to transmit data signals from store and forward repeater 22 to subscriber unit 12. That is, link 11 has a different carrier frequency than link 23. In such an embodiment, subscriber unit 12 is tuned to the frequency of the of the rf carrier transmitted from store and forward repeater 22. Such an embodiment is used for example in conditions where some of the subscriber units are able to receive strong data signals from a local base station repeater cell and other subscriber units are not able to receive strong data signals from the same local base station repeater cell.

With reference still to FIG. 2, in yet another embodiment of the present invention local base station repeater cell 10 transmits data signals in packets. Store and forward repeater 22 receives the data signal packet and stores one data signal packet in memory 26. Controller 28 then transfers the data signal packet to transmitter 30 for transmission at a later time.

Figure 3:
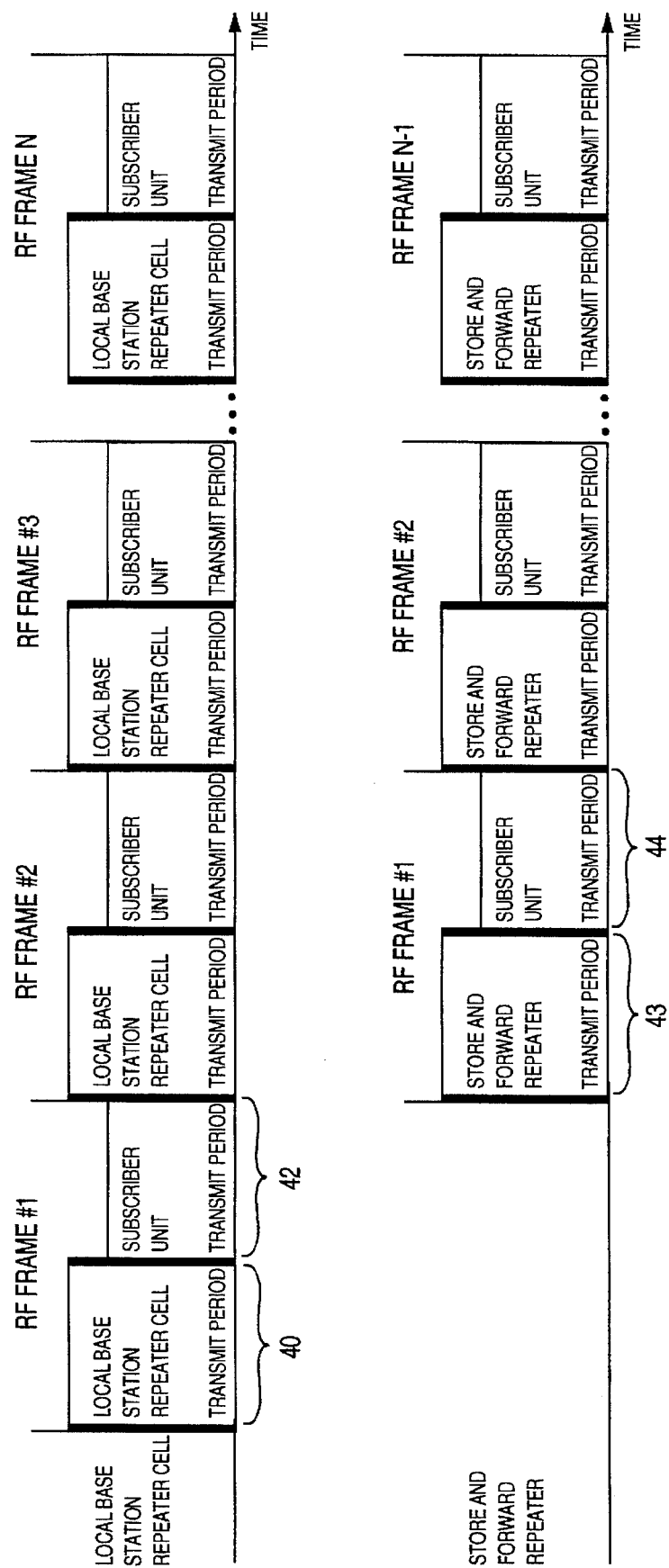
FIG. 3 is a diagram of the timing relationship of data packets transmitted by a local base station repeater cell and later retransmitted by a store and forward repeater in accordance with the present invention.

With reference next to FIG. 3, a diagram showing the timing relationship between rf data signal packets transmitted from the local base station repeater cell and the same rf data signal packets transmitted at a later time by the store and forward repeater. As shown in FIG. 3, in the present embodiment, the local base station repeater cell transmits a data signal packet for a first period of time 40 and then a second period of time 42 is allotted for the subscriber unit to transmit response data signals. However, the store and forward repeater receives the data signal packet transmitted by the local base station repeater cell, places the data signal packet in memory, and retransmits the data signal packet during a third period of time 43 while leaving a fourth period of time 44 for the subscriber unit to transmit a response data signal to the local remote receiver.

As shown in FIG. 3, in the present embodiment, the store and forward repeater begins transmitting the data signal packet of RF Frame 1 when the local base station repeater cell begins transmitting the data signal packet of RF Frame 2. Likewise, the time allotted for the subscriber unit response period of RF Frame 1 ends at the same time the subscriber unit response period of RF Frame 2 ends for the local base station repeater cell. That is, the transmission and response periods of the RF Frames of the local base station repeater cell are synchronized with the transmission and response periods of the RF Frames of the store and forward repeater. In the present invention, by synchronizing the transmissions of the RF Frames, all transmissions to and from the subscriber units remain synchronously related to a base station broadcast signal and timed for multiplexed message transmission with the local base station repeater cell. Although the repeater is delayed by one frame in the present embodiment, the present invention is also well suited to having the repeater delayed by any number of frames.

As shown in FIG. 3, in the present embodiment, transmissions from the store and forward repeater are delayed by one RF Frame. Therefore, when the local base station repeater cell is beginning to transmit RF Frame N, the store and forward repeater is beginning to transmit RF Frame N-1. Although a delay of one RF Frame is used in the present embodiment, the present invention is also well suited to having numerous other periods of delay.

Thus, the present invention provides an interactive data broadcast network which provides for effective transmission of data signals from a local base station repeater cell to subscriber units in areas where such communication has previously been impaired, provides for the reception of strong rf signals at the subscriber units, does not require the addition of numerous costly local station repeater cells, is not dependent on the physical location of the subscriber unit, and does not significantly increase the cost of communication within the interactive two-way broadcast data service network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the claims appended hereto and their equivalents.

I claim:

1. An interactive data broadcast network configuration having a network hub switching center for routing communications to and from a plurality of subscriber units comprising:

subscriber units dispersed at various locations within a base station geographic area, local base station repeater cell means for communicating with subscriber units within a local base station geographic area associated with said local base station repeater cell means by way of first data signals of variable lengths synchronously related to a base station broadcast signal and timed for multiplexed message transmission, said first data signals broadcast on a first carrier frequency, said local base station repeater cell means further comprising, base station data processing and transmission means for transmitting to a set of said subscriber units contained within said local base station geographic area associated with said local base station repeater cell means, and a receiver for receiving from a subset of said set of subscriber units second data messages of variable lengths broadcast on a second carrier frequency, said second data messages multiplexed and synchronously related to said first data signals of variable lengths to provide point-to-point communication between said local base station repeater cell means and said subset of said subscriber units, store and forward repeater means for receiving said first data signals of variable lengths transmitted by said local base station repeater cell on said first carrier frequency and forwarding said first data signals of variable lengths to said subscriber units on a third carrier frequency, and reception means for receiving and processing said second data signals broadcast at a low power on said second carrier frequency from said subscriber units, said reception means further comprising a local remote receiver disposed within one of a plurality of cell subdivision sites partitioned from said local base station geographic area associated with said local base station repeater cell means, said plurality of cell subdivision sites dispersed over said local base station geographic area, each of said local remote receivers adapted for receiving said low power second data signals from said subscriber units within range of said local remote receiver and forwarding said second data signals to said local base station repeater cell means.

2. The interactive data broadcast network configuration of claim 1 wherein said store and forward repeater means further includes:

receiver means for receiving said first data signals transmitted by said local base station repeater cell means on said first carrier frequency, memory means coupled to said receiver means for storing said first data signals received by said receiver means, transmitter means coupled to said memory means for transmitting said first data signals stored in said memory means to said subscriber units on said third carrier frequency, controller means coupled to said memory means for controlling the transfer of said first data signals from said memory means to said transmitter means, and power supply means for providing power to said store and forward repeater means.

3. The interactive data broadcast network configuration of claim 1 wherein said first carrier frequency is approximately 218–219 MHz.

4. The interactive data broadcast network configuration of claim 1 wherein said second carrier frequency is approximately 218–219 MHz.

5. The interactive data broadcast network configuration of claim 1 wherein said first carrier frequency is the same as said third carrier frequency.

6. The interactive data broadcast network configuration of claim 5 wherein the intensity of said first data signals transmitted by said store and forward repeater on said third carrier frequency is greater than the intensity of said first data signals when said first data signals are received by said store and forward repeater on said first carrier frequency.

7. The interactive data broadcast network configuration of claim 6 wherein said first and third carrier frequencies are approximately 218–219 MHz.

8. The interactive data broadcast network configuration of claim 1 wherein said memory means is further comprised of a shift register.

9. The interactive data broadcast network configuration of claim 1 wherein said base station repeater cell means transmits said first data signals in packets.

10. The interactive data broadcast network configuration of claim 9 wherein said store and forward repeater stores at least one of said packets of data and retransmits said at least one of said packets of data on said third carrier frequency to said subscriber units.

11. The interactive data broadcast network configuration of claim 10 wherein said retransmission of said at least one of said packets of data by said store and forward repeater is synchronized with the transmission of packets of data by said local base station repeater cell and with said base station broadcast signal.

12. An interactive data broadcast network system having a network hub switching center, said interactive data broadcast network system further comprising:

at least one subscriber unit receiving and transmitting data during operation of said interactive data broadcast network system, a local base station repeater cell including a transmitter and a receiver for communicating with said at least one subscriber unit during operation of said interactive data broadcast network system, a store and forward repeater communicatively coupled to said local base station repeater cell so as to receive data from said local base station and forward said data to said at least one subscriber unit, said store and forward repeater further comprising:

a receiver receiving data from said local base station, a memory coupled to said receiver to store said data received from said base station by said receiver, a transmitter coupled to said memory to transmit said data stored in said memory, a controller coupled to said memory to control a transfer of data from said memory to said transmitter, and a power supply that provides power to components of said store and forward repeater, and a local remote receiver communicatively coupled to said at least one subscriber unit and said local base station repeater cell to receive data transmitted by said at least one subscriber unit and to forward said data transmitted by said at least one subscriber unit to said local base station.

13. The interactive data broadcast network system of claim 12 wherein said local base station repeater cell and said store and forward repeater are communicatively coupled via an rf link.

14. The interactive data broadcast network system of claim 13 wherein said rf link is at approximately 218–219 MHz.

15. The interactive data broadcast network system of claim 12 wherein said store and forward repeater and said subscriber unit are communicatively coupled via an rf link.

16. The interactive data broadcast network system of claim 15 wherein said rf link is at approximately 218–219 MHz.

17. The interactive data broadcast network system of claim 12 wherein said subscriber unit and said local remote receiver are communicatively coupled via an rf link.

18. The interactive data broadcast network system of claim 17 wherein said rf link is at approximately 218–219 MHz.

19. The interactive data broadcast network system of claim 12 wherein said memory of said store and forward repeater is a shift register.

20. A method for communicating in a two-way interactive data broadcast network having a network hub switching center comprising the steps of:

transmitting first data signals of variable lengths synchronously related to a base station broadcast signal and timed for multiplexed message transmission from local base station repeater cell means on a first carrier frequency, receiving at a receiver of a store and forward repeater said first data signals of variable lengths transmitted by said local base station repeater cell on said first carrier frequency, transmitting said first data signals of variable lengths from a transmitter of said store and forward repeater to local subscriber units on a second carrier frequency, receiving at a respective receiver of said local subscriber units said first data signals of variable lengths transmitted by said store and forward repeater on said second carrier frequency, transmitting second data messages of variable lengths synchronously related to said base station broadcast signal and timed for multiplexed message transmission from a transmitter of at least one of said local subscriber units to a local remote receiver on a third carrier frequency, transmitting said second data messages of variable lengths from said local remote receiver to said local base station repeater cell means such that point-to-point communication between said local base station repeater cell means and said local subscriber units is achieved.

21. The two-way interactive data broadcast network communication method of claim 20 wherein the step of transmitting first data signals from local base station repeater cell means on a first carrier frequency further includes transmitting said first data signals on a first carrier frequency of approximately 218–219 MHz.

22. The two-way interactive data broadcast network communication method of claim 20 wherein the step of transmitting first data signals from a store and forward repeater on a second carrier frequency further includes transmitting said first data signals on a second carrier frequency of approximately 218–219 MHz.

23. The two-way interactive data broadcast network communication method of claim 20 wherein the step of transmitting second data signals from at least one of said local subscriber units to a local remote receiver on a third carrier frequency further includes transmitting said second data signals on a third carrier frequency of approximately 218–219 MHz.

24. The two-way interactive data broadcast network communication method of claim 20 wherein the step of transmitting first data signals from a store and forward repeater to local subscriber units on a second carrier frequency further includes transmitting said first data signals on a second carrier frequency which is the same as said first carrier frequency.

25. The two-way interactive data broadcast network communication method of claim 24 wherein the step of transmitting said first data signals on a second carrier frequency which is the same as said first carrier frequency further includes transmitting said first data signals from said store and forward repeater at an intensity which is greater than the intensity of said first data signals when said first data signals are received at said store and forward repeater.

26. The two-way interactive data broadcast network communication method of claim 24 wherein the step of transmitting said first data signals on a second carrier frequency which is the same as said first carrier frequency further includes transmitting said first data signals on a carrier frequency of approximately 218–219 MHz.

27. The two-way interactive data broadcast network communication method of claim 24 wherein the step of receiving at a receiver of a store and forward repeater said first data signals further includes the steps of:

storing said first data signals received by said receiver in memory means of said store and forward repeater, and transferring said first data signals from said memory means to a transmitter of said store and forward repeater.

28. The two-way interactive data broadcast network communication method of claim 27 wherein the step of storing said first data signals in memory means of said store and forward repeater further includes storing said first data signals in a shift register.

29. The two-way interactive data broadcast network communication method of claim 20 wherein the step of transmitting first data signals from local base station repeater cell means on a first carrier frequency further includes transmitting said first data signals in packets.

30. The two-way interactive data broadcast network communication method of claim 20 wherein the step of transmitting first data signals from a store and forward repeater to local subscriber units on a second carrier frequency further includes transmitting said first data signals in packets.

31. The two-way interactive data broadcast network communication method of claim 30 wherein the step of transmitting first data signals in packets from a store and forward repeater to local subscriber units on a second carrier frequency further includes synchronizing the transmission of said packets with said local base station repeater cell means and said base station broadcast signal.

* * * * *